(12) United States Patent
Yamada et al.

(10) Patent No.: US 8,176,263 B2
(45) Date of Patent: May 8, 2012

(54) MEMORY MANAGEMENT APPARATUS AND METHOD FOR SAME

(75) Inventors: Kenji Yamada, Gamagori (JP); Hideaki Ishihara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 1091 days.

(21) Appl. No.: 12/076,021

(22) Filed: Mar. 13, 2008

(65) Prior Publication Data

US 2008/0244161 A1      Oct. 2, 2008

(30) Foreign Application Priority Data

Mar. 27, 2007   (JP) .................................. 2007-81493
Dec. 14, 2007   (JP) ............................... 2007-323307

(51) Int. Cl.
G06F 12/02         (2006.01)
(52) U.S. Cl. ......................................... 711/147; 711/171
(58) Field of Classification Search .................. 711/147, 711/171
See application file for complete search history.

(56) References Cited

U.S. PATENT DOCUMENTS

| 6,009,078 | A | 12/1999 | Sato | |
|---|---|---|---|---|
| 6,658,014 | B1 | 12/2003 | Tezuka | |
| 2003/0120885 | A1* | 6/2003 | Bonola | .......................... 711/170 |

FOREIGN PATENT DOCUMENTS

| JP | A-02-054346 | 2/1990 |
|---|---|---|
| JP | A-02-54346 | 2/1990 |
| JP | A-11-68784 | 3/1999 |
| JP | A-11-068784 | 3/1999 |
| JP | 2000-200210 A | 7/2000 |

OTHER PUBLICATIONS

Office Action dated May 12, 2009 from Japan Patent Office in the corresponding JP patent application No. 2007-323307 (and English Translation).

Notice of Reasons for Rejection issued from the Japanese Patent Office on May 12, 2009 in the corresponding Japanese patent application No. 2007-323307 (and English translation).

* cited by examiner

*Primary Examiner* — Jared Rutz

(74) *Attorney, Agent, or Firm* — Posz Law Group, PLC

(57) ABSTRACT

A memory management apparatus uses a link list memory to manage a use area and a vacant area of a data memory. The use of the use area of the data memory by each of plural ports is restricted, and the use area of the data memory is configured to be always provided for each of the plural ports. In this manner, monopolized use of the data memory by a specific port is prevented and each of the plural ports is securely provided with the use area of the data memory under control of the memory management apparatus.

12 Claims, 14 Drawing Sheets

FIG. 2A

DATA MEM:
| | |
|---|---|
| 0 | DATA P0-0 |
| 1 | DATA P0-1 |
| 2 | DATA P2-0 |
| 3 | DATA P1-1 |
| 4 | Idle 0 |
| 5 | DATA P0-2 |
| 6 | DATA P1-0 |
| 7 | Idle 1 |

LINKLIST MEM:
| | |
|---|---|
| 0 | ADR 1 |
| 1 | ADR 5 |
| 2 | ADR (4) |
| 3 | ADR (2) |
| 4 | ADR 7 |
| 5 | ADR (6) |
| 6 | ADR 3 |
| 7 | ADR (0) |

| | UAC | | | NUAC | |
|---|---|---|---|---|---|
| | P0 | P1 | P2 | Idle | V-Idle |
| T ADR | 0 | 6 | 2 | 4 | – |
| E ADR | 5 | 3 | 2 | 7 | – |
| Q COUNT | 3 | 2 | 1 | 2 | 1 |
| Q-U-LIMIT | 4 | 4 | 4 | – | – |
| Q-L-LIMIT | 1 | 1 | 2 | – | – |
| Q FULL FLAG | 0 | 0 | 0 | – | – |
| Q OV_MIN FLAG | 1 | 1 | 0 | – | – |
| Q EMPTY FLAG | 0 | 0 | 0 | – | 0 |

FIG. 2B

DATA MEM:
| | |
|---|---|
| 0 | DATA P0-0 |
| 1 | DATA P0-1 |
| 2 | DATA P2-0 |
| 3 | DATA P1-1 |
| 4 | *DATA P0-3* |
| 5 | DATA P0-2 |
| 6 | DATA P1-0 |
| 7 | Idle 1 |

LINKLIST MEM:
| | |
|---|---|
| 0 | ADR 1 |
| 1 | ADR 5 |
| 2 | ADR (4) |
| 3 | ADR (2) |
| 4 | ADR (7) |
| 5 | *ADR 4* |
| 6 | ADR 3 |
| 7 | ADR (0) |

| | UAC | | | NUAC | |
|---|---|---|---|---|---|
| | P0 | P1 | P2 | Idle | V-Idle |
| T ADR | 0 | 6 | 2 | 7 | – |
| E ADR | 4 | 3 | 2 | 7 | – |
| Q COUNT | 4 | 2 | 1 | 1 | 0 |
| Q-U-LIMIT | 4 | 4 | 4 | – | – |
| Q-L-LIMIT | 1 | 1 | 2 | – | – |
| Q FULL FLAG | 1 | 0 | 0 | – | – |
| Q OV_MIN FLAG | 0 | 1 | 0 | – | – |
| Q EMPTY FLAG | 0 | 0 | 0 | – | 1 |

NO DIST. LIMIT

- QUEUE
  - P0 High = 512
  - P0 Middle = 512
  - P0 Low = 512
  - P1 High = 512
  - P1 Middle = 512
  - P1 Low = 512
  - P2 High = 512
  - P2 Middle = 512
  - P2 Low = 512
  - P3 High = 512
  - P3 Middle = 512
  - P3 Low = 512
- OUTPUT PORT
  - Port0 = 512
  - Port1 = 512
  - Port2 = 512
  - Port3 = 512
- CLASS
  - High = 512
  - Middle = 512
  - Low = 512

512 FRAMES

QUEUE FIXED DIST.

- QUEUE
  - P0 High = 42
  - P0 Middle = 43
  - P0 Low = 43
  - P1 High = 42
  - P1 Middle = 43
  - P1 Low = 43
  - P2 High = 42
  - P2 Middle = 43
  - P2 Low = 43
  - P3 High = 42
  - P3 Middle = 43
  - P3 Low = 43
- OUTPUT PORT
  - Port0 = 512
  - Port1 = 512
  - Port2 = 512
  - Port3 = 512
- CLASS
  - High = 512
  - Middle = 512
  - Low = 512

FIG. 11C

OUTPUT PORT
FIX / SHARE

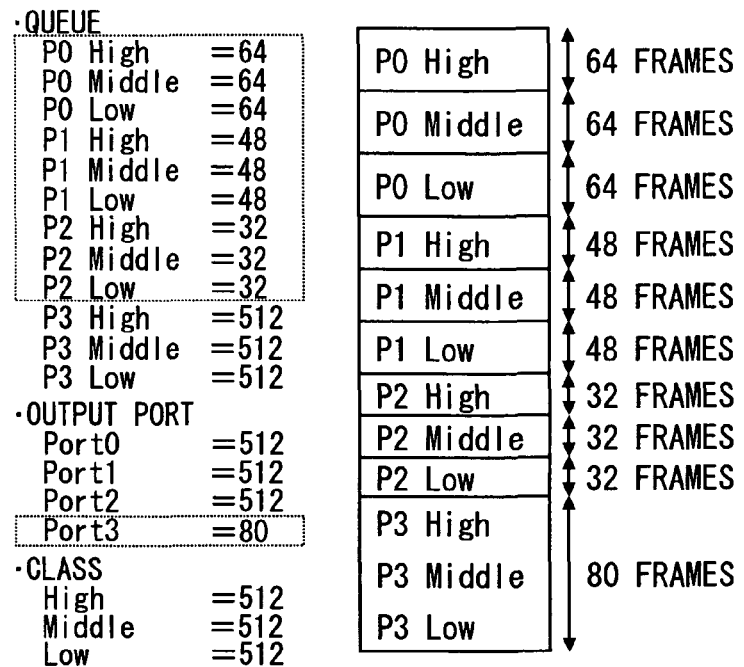

- QUEUE
  - P0 High = 64
  - P0 Middle = 64
  - P0 Low = 64
  - P1 High = 48
  - P1 Middle = 48
  - P1 Low = 48
  - P2 High = 32
  - P2 Middle = 32
  - P2 Low = 32
  - P3 High = 512
  - P3 Middle = 512
  - P3 Low = 512
- OUTPUT PORT
  - Port0 = 512
  - Port1 = 512
  - Port2 = 512
  - Port3 = 80
- CLASS
  - High = 512
  - Middle = 512
  - Low = 512

FIG. 11D

QUEUE-OUTPUT PORT
FIX / SHARE

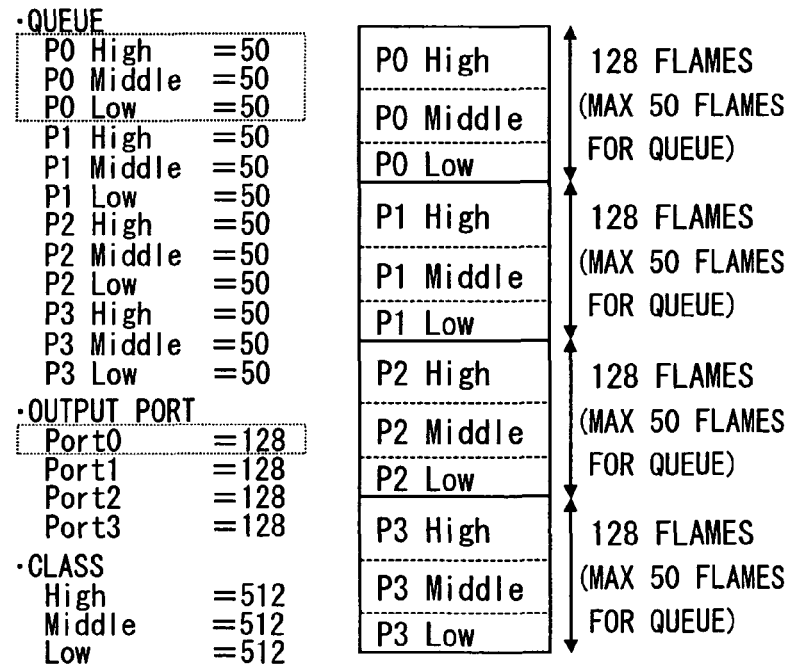

- QUEUE
  - P0 High = 50
  - P0 Middle = 50
  - P0 Low = 50
  - P1 High = 50
  - P1 Middle = 50
  - P1 Low = 50
  - P2 High = 50
  - P2 Middle = 50
  - P2 Low = 50
  - P3 High = 50
  - P3 Middle = 50
  - P3 Low = 50
- OUTPUT PORT
  - Port0 = 128
  - Port1 = 128
  - Port2 = 128
  - Port3 = 128
- CLASS
  - High = 512
  - Middle = 512
  - Low = 512

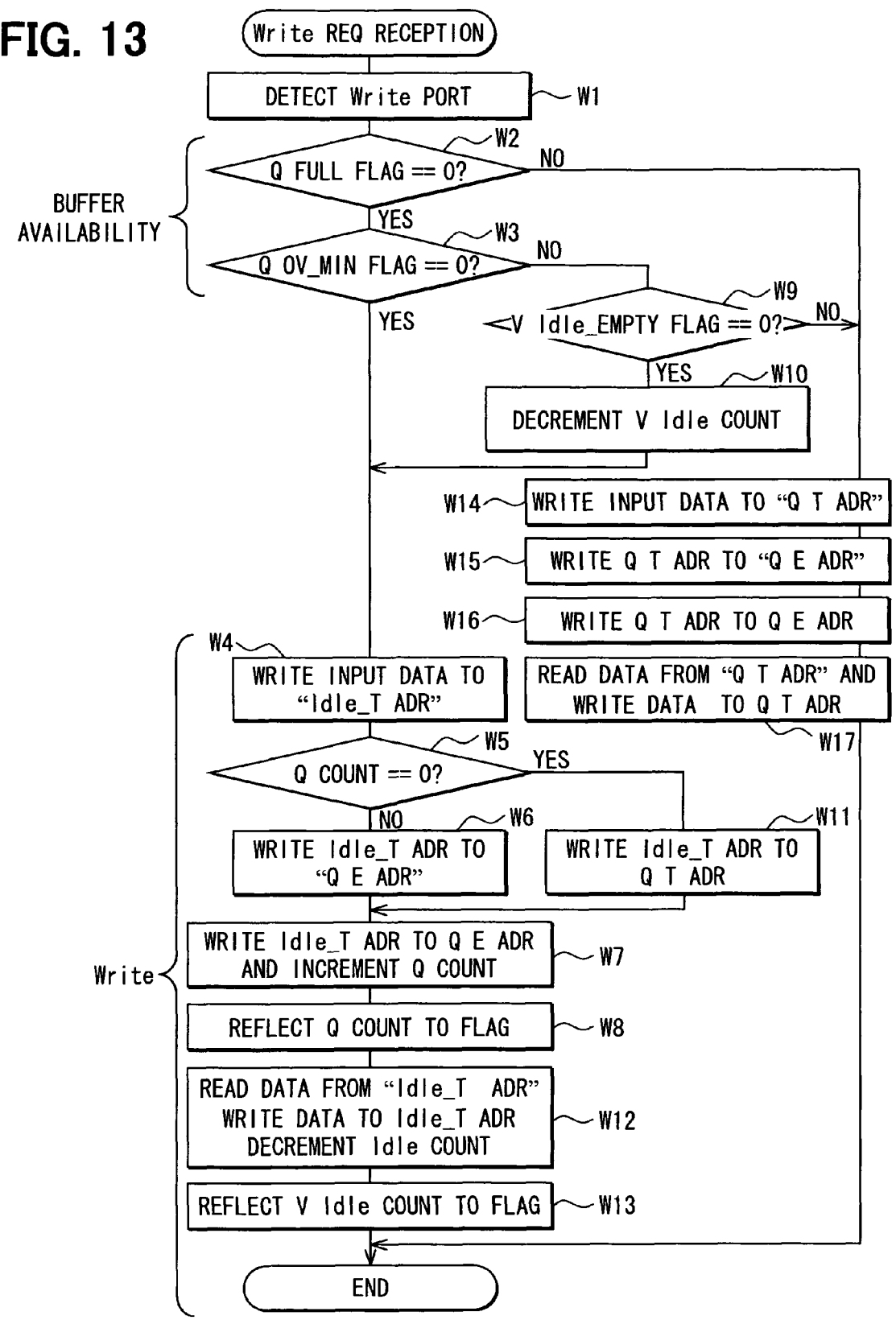

MEMORY MANAGEMENT APPARATUS AND METHOD FOR SAME

CROSS REFERENCE TO RELATED APPLICATION

The present application is based on and claims the benefit of priority of Japanese Patent Applications No. 2007-81493 filed on Mar. 27, 2007 and NO. 2007-323307 filed on Dec. 14, 2007, the disclosures of which are incorporated herein by reference.

FIELD OF THE INVENTION

The present disclosure generally relates to a memory management apparatus and method for use in a memory.

BACKGROUND INFORMATION

In recent years, one data memory is susceptible to an input request and/or an output request that is issued by plural packets in, for example, a course of execution of communication applications, thereby requiring a division of the data memory into plural use areas for each of the plural packets. In the situation described above, a link list memory is employed to manage the use areas for efficient use of vacancy of the data memory. One of such memory management methods is disclosed in Japanese patent document JP-A-2000-200210.

However, the memory management method by the link list has a problem that data from a specific input request occupies almost all memory areas with the rest of the input requests having no vacant memory areas, because the conventional management method allocates the memory areas in a time-series manner, that is, in a first-come first-served basis.

SUMMARY OF THE INVENTION

In view of the above and other problems, the present disclosure provides a memory management apparatus and a memory management method that securely reserves a memory area for each of plural access units that share one data memory.

The memory management apparatus of the present invention specifies a limitation on use areas in a data memory allocated by each of plural access units when use of the data memory is managed by a link list memory that governs use areas and vacant areas. Thus, the memory management apparatus prevents monopolized memory use by a specific access unit, and provides each of the plural access units with memory allocation in a secured manner.

BRIEF DESCRIPTION OF THE DRAWINGS

Other objects, features and advantages of the present invention will become more apparent from the following detailed description made with reference to the accompanying drawings, in which:

FIGS. 2A, 2B, 2C show illustrations of a data memory, a link list memory and each of registers as well as flag conditions;

FIGS. 11A, 11B, 11C, 11D respectively show another illustration of divisional use of the data memory by each of plural access units;

FIG. 13 shows a flowchart of details of a Write control in a third embodiment.

DETAILED DESCRIPTION (First Embodiment)

Figure 1:
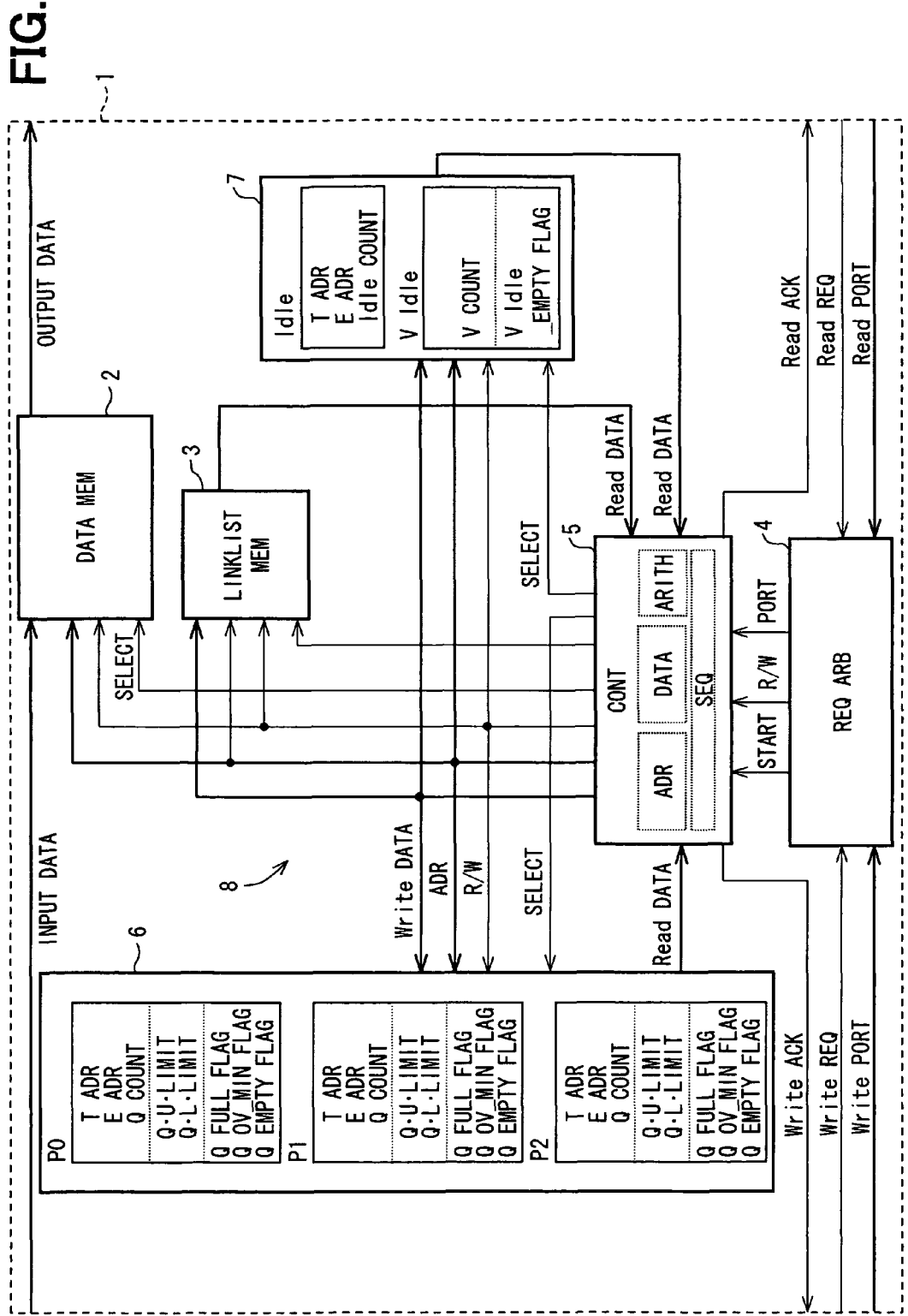
FIG. 1 shows a block diagram of a memory management apparatus in an embodiment of the resent invention.

The first embodiment of the present invention is explained referring to FIG. 1-FIG. 6 as follows. FIG. 1 shows a configuration of a data input and output system including a memory management device of the present invention. For example, such a system is used for devices transmitting and receiving communication data input and output system has a data memory 2, and three ports P0-P2 (an access unit) share the data memory 2 for reading and writing data. Further, regarding the data memory 2, a link list method by using a link list memory 3 is used for memory management of a use area and a vacant area.

The ports P0-P2 access the data memory 2 through a request arbitration unit 4 and a control unit (serving as a read control unit, a write control unit) 5. When either of the ports P0-P2 that the request was admitted outputs a Write port or a Read port, and performs Write access, or Read access. The request arbitration unit 4 outputs for the control unit 5 an initialization signal, a R/W control signal, and a port signal that indicates a port to perform access. The control unit 5 has a sequencer (a state machine) and an arithmetic unit, and addressing as well as a select control and a data control are performed by the control unit 5.

When the ports P0-P2 uses the data memory 2, a use area administration unit 6 uses a register group or a counter to manage each of the use areas. Management parameters in the use area administration unit 6 are explained as follows.

Queue top address: the top address of the use area

Queue end address: the end address of the use area

Queue counter: the size of the use area that is actually used (where the data is written)

Queue upper limit: the maximum number of the use area (a fixed value by the user setting)

Queue lower limit: the minimum number of the use area

By setting the fixed value by the user setting, a minimum amount of the use area for each of the ports P0-P2 is reserved.

In addition, the number of the upper limit (an upper limit value) is set separately from the number of the lower limit, and thus the maximum number of the use area is controlled. In this case, "queue" is synonymous to "a use area."

Each of the following flags is automatically set according to the state of the queue counter by the use area administration unit 6.

Queue FULL flag: set when the queue counter exceeds the number of the upper limit Queue OV_MIN flag: set when the queue counter becomes it than the number of the lower limit Queue EMPTY flag: set when the queue counter becomes zero On the other hand, the vacant area administration unit 7 is a register group to manage the vacant area of the data memory 2. Management parameters in the vacant area administration unit 7 are explained as follows.

Idle top address: the top address of the vacant area
Idle end address: the end address of the vacant area
Idle counter: the size of the vacant area Further, a virtual idle counter is prepared separately from the idle counter. The virtual idle counter is a counter that shows a difference between a counter value and a total of the queue counter values, and the total of the queue counter values is calculated by adding up, for all of the ports P0-P2, the difference between a counter value of the idle counter and a counter value of the queue counter when the queue counter value exceeds the queue lower limit. The value of the difference is set by the vacant area administration unit 7. In this case, "Idle" is synonymous to "a vacant area."

By setting the number of the lower limit about each of the use areas so that the use areas for each of the ports P0-P2 are reserved, data writing to the data memory 2 is prohibited for any of the ports when the use area of a writing port appears to have the vacant area on a condition that the idle counter is equal to zero (i.e., when a virtual idle EMPTY flag is set). The lower limit number is set for reserving the minimum amount of the use area for other ports.

Then, the control unit 5 manages the data memory 2 by the link list method that writes to the link list memory 3 link list addresses of the use areas and the vacant areas while referring to conditions of registers, counters and flags of the use area administration unit 6 and the vacant area administration unit 7. In addition, the control unit 5 outputs Write acknowledge signal and Read acknowledge signal to an external unit when write processing and reading processing for the data memory 2 are finished. In the above-mentioned configuration, the data input and output system 1 with an exclusion of the request arbitration unit 4 constitutes the memory management device 8. In addition, about the basic part of the management method by using the link list, the disclosure of a well-known art such as Japanese patent document JP-A-2000-200210 can be referenced.

The operation of the present embodiment is explained next by referring to FIGS. 2A to 6.

(Whole Processing)

Figure 3:
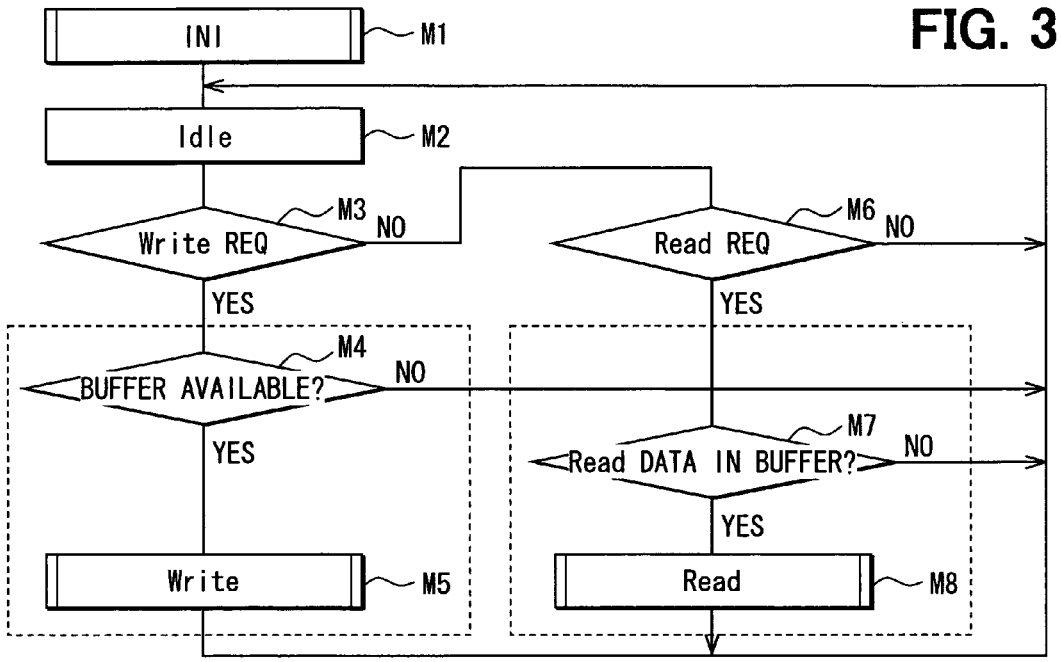
FIG. 3 shows a flowchart of an entire process of memory management.
Figure 10:
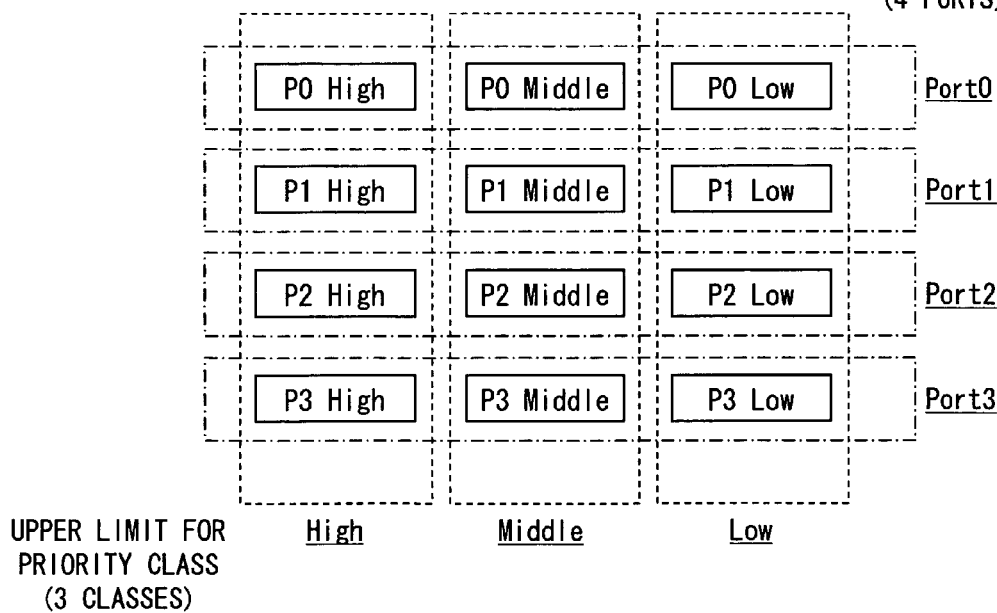
FIG. 10 shows an illustration of divisional use of the data memory by each of plural access units.

FIG. 3 is a flowchart showing the whole processing content carried out mainly by the control unit 5. The control unit 5 performs initial setting shown in FIG. 4 for the link list memory 3, the use area administration unit 6 and the vacant area administration unit 7 in step M1. Then, the control unit 5 waits for either of Write request or Read request that is issued by one of the ports P0-P2 in steps M3 and M6 (step M2, in an idle state). Then, Write processing is carried out in step M5 when there is Write request (step M3: YES) with a determination whether there is a vacant area in the use area (a buffer) of the data memory 2 (step M4) is affirmative. On the other hand, Read processing is carried out in step M8 when there is Read request (step M6: YES) with a determination whether there is data to be read out in the use area of the data memory 2 (step M7) is affirmative.

(Initial Setting Processing)

Figure 4:
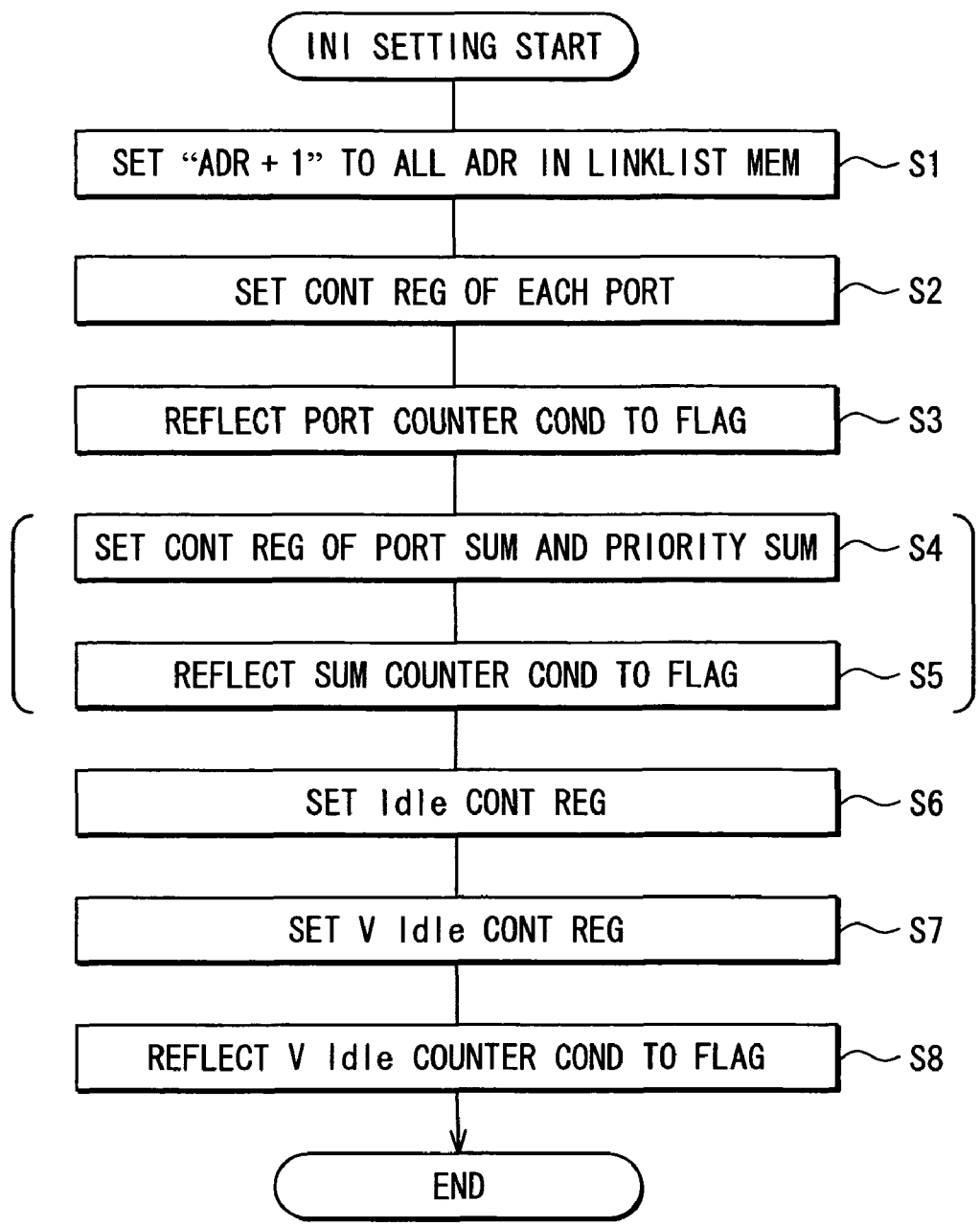
FIG. 4 shows a flowchart of details of an initial setting process in step M1 in FIG. 3.

The initial setting processing in step M1 is explained next with reference to FIG. 4. First, the control unit 5 writes data of "address +1" to all addresses of the link list memory 3 in step S1. Then, a control register of each of the ports P0-P2 is set in step S2. Then, the queue counters are reset to 0, and the number of the queue upper limit and the number of the queue lower limit are set according to the specifications of the user. In addition, the queue top address and the queue end address are not required at this point because they are set in the course of processing.

Then, the use area administration unit 6 initializes the FULL flag, the OV_MIN flag, the EMPTY flag according to the state of the queue counter of each of the ports P0-P2 successively (step S3). In this case only the queue EMPTY flag is set. In addition, continuing steps of S4, S5 are not used in the first embodiment, thereby leaving the description to the second embodiment.

The control unit 5 sets the idle top address and the idle end address of the vacant area administration unit 7 to the top address and the end address of the link list memory (a buffer) 3, and the idle counter is set to have the size of the link list memory 3 (because all areas are vacant at this point in step S6). Then, the value of the virtual idle counter is initialized as described above in step S7, and the condition of the virtual idle counter is reflected to the virtual idle EMPTY flag in step S8.

(Write Control)

Write control in steps M4, M5 is explained next with reference to FIG. 5. First, it is determined which of the ports P0-P2 is going to write in step W1, then, whether the queue FULL flag of the determined port (i.e., a writing port) is "zero" is determined in step W2. If the queue FULL flag is "1" that indicates NO, the situation is that the use area of the writing port are fully occupied by the data written therein. Therefore, the write processing is finished without writing to the data memory 2.

On the other hand, if the queue FULL flag is "zero" that indicates YES, the situation is that the upper limit of the writing port is not reached, thus whether the queue OV_MIN flag is "zero" is determined successively in step W3. If the queue OV_MIN flag is "zero" that indicates YES, the situation is that the use area of the writing port has not yet reached to the lower limit, thus allowing the write processing is unconditionally allowed. Therefore, data are written to an address of the link list memory 3 which the idle top address register shows at this point in step W4 (data is first written to the top address of the memory 3).

In addition, in step W3, if the queue OV_MIN flag is "1" that indicates NO, the situation is that the use area of the writing port exceeds the lower limit. Therefore the process proceeds to step W9, and determines whether the virtual idle EMPTY flag is "zero". If the flag concerned is "1", processing is finished without writing data, because the flag indicates that the data memory 2 does not have the vacant area with the minimum amount secured for the other ports. On the other hand, if the flag is "zero" indicating YES, the process proceeds to step W4, data is written to the memory 2 because that indicates there is a vacant area in the data memory 2. In addition, the processing in steps W2, W3, W9, and W10 corresponds to the processing in step M4 in FIG. 3.

After writing data in step W4, successively whether the queue counter of the writing port is "zero" is determined in step W5. If the counter concerned is not "zero" indicating NO, the situation is that data written in the use area are not read out entirely at that point. However, because the queue counter is "zero" for first write processing due to the initial setting, step W4 is determined as "YES," and the value of the idle top address register is written to the queue top address register for first at the point in time when a note was performed in step W11. Then, the value of the register concerned is written to the queue end address register (at the point when only one data is written, the top of the use area and the end of the use area are same), and the queue counter is incremented because one area is used at this point in step W7.

In addition, because it is determined as NO in step W5 when the same writing port writes the next data at the next time, the process proceeds to step W6, and the value of the idle top address register is written to an address of the link list memory 3 that is indicated by the queue end address register. Then, the process proceeds to step W7. Then, in step W8, the condition of the queue counter is reflected to each of the queues (FULL, OV_MIN, EMPTY). Then, data are read out from an address of the link list memory 3 that is indicated by the idle top address register, and the data are written to the idle top address register, and the idle counter is decremented in step W12. Finally, processing is finished when the EMPTY flag reflects the condition of the virtual idle counter in step W13.

Regarding the write control stated above, processing of write prohibition based on the determination result of each flag in steps W2, W3, W9 and a processing about the virtual idle counter in W10, W13 for the determination process of the write prohibition are among novel portions of the present disclosure.

(Read Control)

Read control corresponding to steps M7 and M8 in FIG. 3 is explained next with reference to FIG. 6. First, which of ports P0-P2 performs reading is determined in step R1, and whether the queue EMPTY flag of the port (i.e., a reading port) is "zero" is determined in step R2. That is, in other words, data writing in the use area of the reading port has not been performed at all and there is no data that is an object of reading if the queue EMPTY flag is set to "1" (step R2: NO). Therefore, data reading is not performed, and processing concludes itself.

On the other hand, in step R3, data are read from an address of the data memory 2 which is indicated by the queue top address register in step R2 (step R2: YES) if the queue EMPTY flag is "zero" that indicates that data for reading exists. Then, whether an idle counter is "zero" is determined successively in step R4. There is a vacant area in the data memory 2 if the counter is not "zero" (step R4: NO). Therefore, the contents of the queue top address register of the reading port are written in at an address of the link list memory 3 which is indicated by the idle end address register in step R5. That is, the end of the vacant area is updated by the address at which data is read in step R3. In addition, the contents of the queue top address register is written in at the idle top address register in step R4 if the idle counter is "zero" (step R4: YES), because the idle counter being equal to "zero" indicates that the data memory 2 does not have a vacant area. That is, the top address of the vacant area is updated by the top address of the use area.

Then, the contents of the queue top address register are written in at the idle end address register successively. That is, the top address of the use area at this point becomes the end address of the vacant area. Then, the idle counter is incremented in step R6 because one of the use areas is freed by reading data therefrom. When data are read from an address of the link list memory 3 which is indicated by the queue top address register next, the data are written in at the queue top address register, and the queue counter is decremented in step R7.

Then, whether a queue OV_MIN flag is "zero" is determined in step R8 after reflecting the states of the queue counters to each of the queues (FULL, OV_MIN, EMPTY) in the same manner as step W8. If the flag concerned is "1" (step R8: NO), the allocation area of the reading port is set greater than the lower limit at the time when the use area is freed. Therefore, when the virtual idle counter is incremented in step R10 and the state of the counter concerned is reflected to the state of the EMPTY flag in step R11, the processing concludes itself. In this case, in addition, step R11 may be passed. On the other hand, because the allocation area of the reading port is not used up to the lower limit if the queue OV_MIN flag is "zero" (step R9: YES), the processing proceeds to step R11 without doing anything.

Figure 2C:
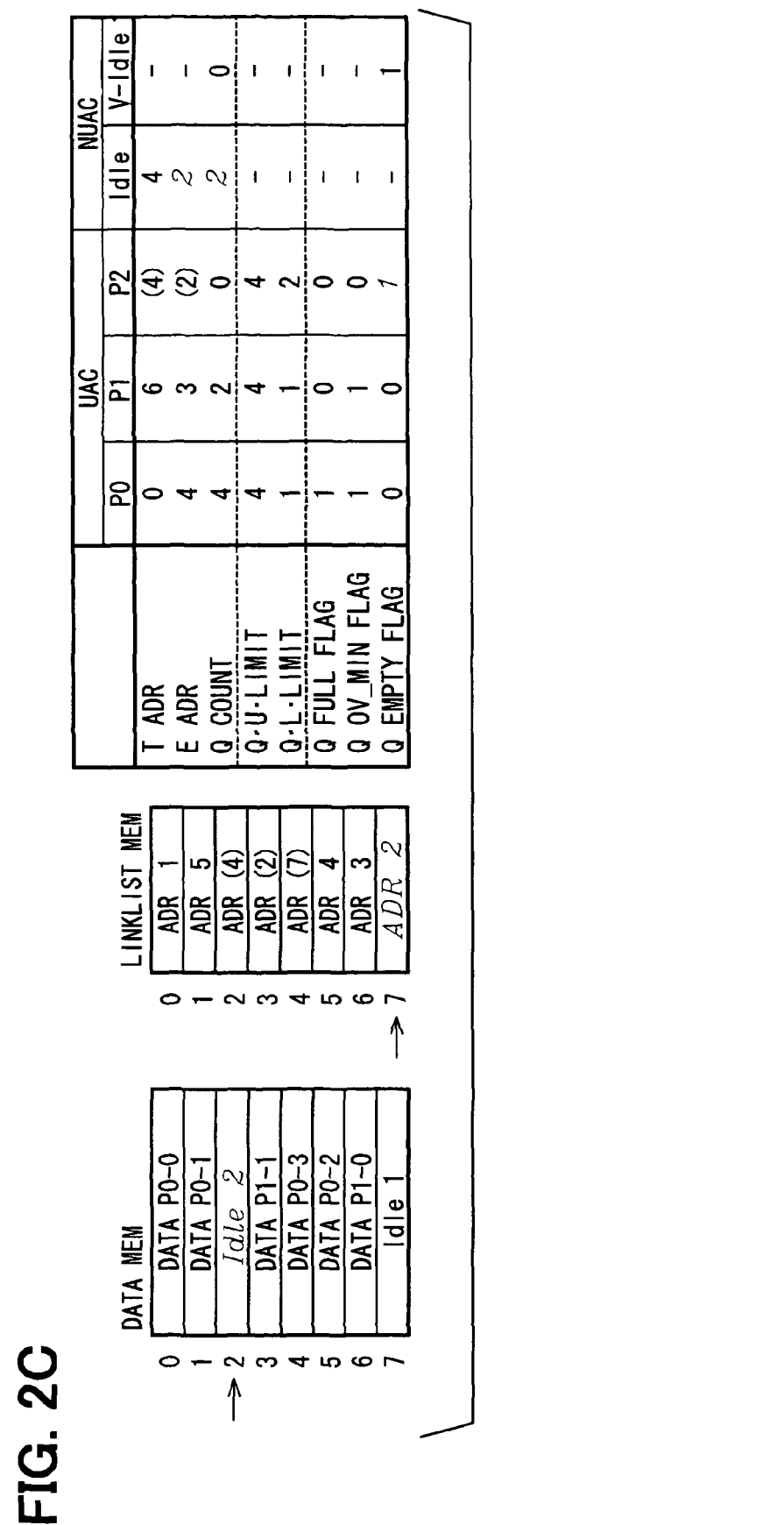

FIGS. 2A to 2C show illustrations of the data memory 2 and the link list memory 3 as well as condition change of each of the registers and the flags at a time when the Write control and the Read control are performed. The initial condition is shown in FIG. 2A, and the vacant area of the data memory 2 (the size of the vacant area in the memory 2 is assumed to be 8 frames) exists at addresses of 4 and 7. In FIGS. 2A to 2C, UAC represents "use area control" and NUAC represents "non-use area (i.e., vacant area) control."

The data placement of the port P0 is:
Data P0-0 is in address 0,
Data P0-1 is in address 1, and
Data P0-2 is in address 5.
The top address of the use area is "zero," the end address is "5," and the value of the queue counter is "3." In addition, the address link in the link list memory 3 is addresses of 0 to 1 to 5 to (6). However, the last address (6) does not indicate the use area of port P0.

In addition, the upper limit of the use area of each of the ports P0, P1, P2 is respectively "4." Though the total size of the upper limits of the use areas exceeds the size of the data memory 2, the lower limits are respectively set to "1," "1," and "2," and the use areas of the specified sizes are at least reserved for respective ports. Further, even when the number of written data does not reach the upper limit, the data writing may be restricted based on a control that considers the condition of the virtual idle counter.

When the port P0 writes the data P0-3 in transition of the conditions in FIG. 2A to 2B mentioned above next, the data is written in at top address "4" (Idle0) of the vacant area of the data memory 2. As a result, the address 4 is written in at the address 5 of the link list memory 3, and the address link in the link list memory 3 is changed to addresses of 0 to 1 to 5 to 4 to (7). Further, the queue FULL flag is set because the end address of the use area is "4," and the value of the queue counter reaches "4," that is, the queue counter reaches the upper limit. Furthermore, the idle top address becomes "7," the idle counter value becomes "1," and the virtual idle counter value decreases to "0," the virtual idle EMPTY flag is set.

When the port P2 reads the data P2-0 in transition of conditions from FIG. 2B to FIG. 2C, the data P2-0 is read from the queue top address 2 of the data memory 2. Then, the address 2 becomes the vacant area, and the use area of port P2 disappears. That is, the value of the queue counter becomes "zero," and the queue EMPTY flag is set. Then, the Idle counter is incremented, with the idle end address of "2." In this case, the queue top address of the port P2 is updated to (4) according to the Read control. However, the update is not substantial because there is no use area.

According to the present embodiment as described above, the limit is established in the use area of the data memory 2 where the ports P0-P2 respectively use for always reserving the use area for each of the ports P0-P2, the memory management device 8 always allocates the use area for each of the ports P0-P2 by prohibiting a monopolized use of the use area in the data memory 2 by a specific port when the use area and the vacant area of the data memory 2 are managed in the data input and output system 1 by using the link list memory 3.

More practically, the number of the lower limit is set on the queue counter of each of the ports P0-P2, and the use area for each unit is reserved by at least the amount of the lower limit based on the vacant area management that calculates the vacant area by subtracting, from the idle counter value indicating the vacant area amount, the sum of the differences of the queue counter value and the lower limit in each of the queue counters when the queue counter value exceeds the lower limit.

The control unit 5 prohibits data writing to the data memory 2 upon having write request from one of the ports P0-P2 if the queue counter of the writing port is greater than the upper limit or if the queue counter is between the upper limit and the lower limit and the value of the virtual idle counter is "zero." That is, in other words, the data writing is prohibited when it is necessary to secure the lower limit of the use area for other ports even if the queue counter value is under the upper limit. In addition, the control unit 5 writes data to an address indicated by the idle top register after decrementing the queue counter, if the queue counter value of the requesting access unit is smaller than the minimum counter value with the virtual idle counter value not being equal to zero, or if the queue counter value is smaller than the maximum counter value and is one of equal to and greater than the minimum counter value with the virtual idle counter value not being equal to zero. That is, when the vacant area is securely reserved in the use area of the writing port, or when the vacant area is reserved after reserving the lower limit of the use area for other ports, data can be written in at the top address of the vacant area.

Then, an address value of the idle top register is written to an address of the link list memory 3 that is indicated by the queue end register of the port concerned if the queue counter is not "zero," because the top of the vacant area comes to the end of the use area after the write processing described above. In addition, because the use area does not have the top in the case that the queue counter is "zero," the top address of the vacant area is written in to the queue top register of the writing port as the top of the use area, and data is overwritten from the top of the use area thereafter.

Furthermore, writing a content of the idle top register to the queue end register is performed with incrementing the queue counter of the requesting access unit, and then reading data from an address in the link list memory 3 that is shown by the idle top register and writing the data to the idle top register is performed with decrementing the idle counter. Therefore, write control is performed while securing the use area of each of the ports. Further, the use area of each of the ports can be set flexibly after having secured the number of the lower limit of the use area.

In addition, when a reading request by one of the ports P0-P2 occurred, the control unit 5 prohibits data reading in the case that the queue counter of the reading port is "zero," or the control unit 5 reads the data from an address of the data memory 2 which is indicated by the queue top register in the case that the queue counter is not "zero."

After the processing mentioned above, the contents of the queue top register are written in at an address of the link list memory 3 indicated by the idle end register and at the idle end register, and the idle counter is incremented when the value of the idle counter is not "zero." In addition, the idle counter is incremented after the contents of the queue top register is written in to the idle top register and the idle end register in the case that the value of the idle counter is "zero." Furthermore, the control unit 5 decrements the queue counter after reading data from an address of the link list memory 3 indicated by the queue top register and writing the data to the queue top register, and, if the queue counter value is greater than the lower limit, the control unit 5 increments the virtual idle counter. Therefore, the reading of data from the use area of each port can be performed adequately.

(Second Embodiment)

FIGS. 7 to 12 illustrates the second embodiment of the present invention, and like parts have like numbers with description focusing on the difference from the first embodiment. A data input and output system 11 in the second embodiment increases the number of the units that reads and writes data from/to the data memory 2, and the request arbitration unit is number as 12 instead of 4, together with the replacement of the control unit from 5 to 13, the use area administration unit from 6 to 14, the memory management device 8 to 15.

There are eight ports of P0-P7, and priorities (classes) of High, Mid, and Low are set to each port. The number of the access units is 24. Each of the units of the High, Mid, and Low priorities in port P0 constitutes a P0 group. In addition, these priorities do not have direct relation with the memory control method of the present invention. The priorities are used to control order to read and write data in each of the ports P0-P7, and the control of the read/write order is performed by a separate component.

In the use area administration unit 14, for each unit, top/end address registers, a queue counter, queue upper/lower limits, queue flags (i.e., FULL, OV_MIN, EMPTY) are prepared, and, for each of the ports P0-P7, a queue counter, a queue upper limit, a queue FULL flag are prepared (a port total administration unit). In addition, the priorities of High, Mid, Low of each of the ports P0-P7 are organized as a group in each of the vertical relationship show in the drawing. Further, for each of the groups, a queue counter, a queue upper limit, a queue FULL flag are prepared (a priority total administration unit). In addition, a group counter and a group upper limit are respectively defined as a total of the numbers of the counter value and the total of the upper limits of the units that belong to the group.

The operation of the second embodiment is explained next with reference to FIGS. 8 to 12. In addition, in the case of the second embodiment, the initial setting (=0) of the queue counter and setting (by the specifications of the user) of the number of the queue upper limit are performed in initial setting processing as shown in FIG. 4 for the port total administration unit and the priority total administration unit in each of the ports in step S4, and the queue FULL flag reflects the state of the queue counter in step S5.

Figure 5:
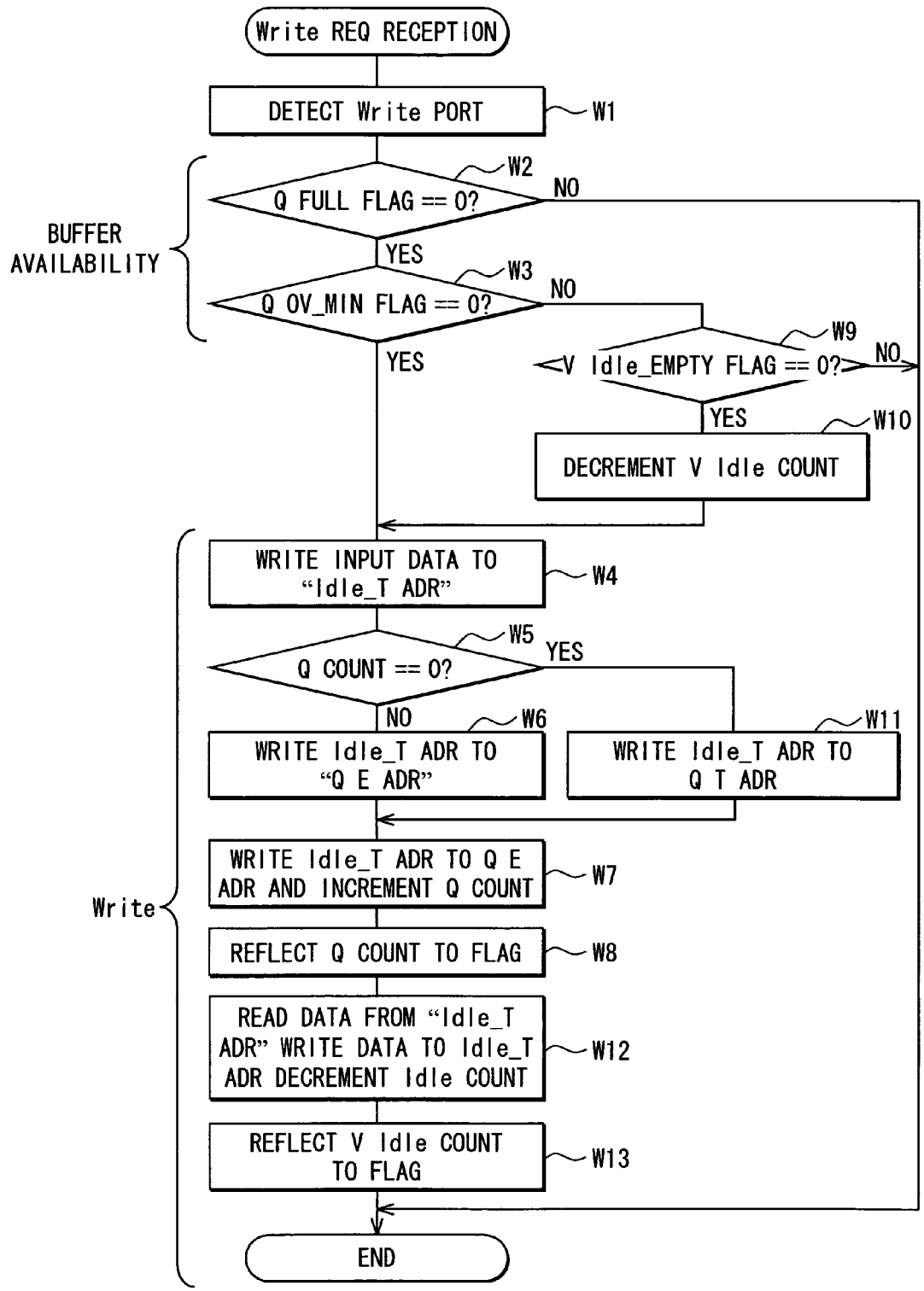
FIG. 5 shows a flowchart of details of a Write control in the first embodiment.
Figure 6:
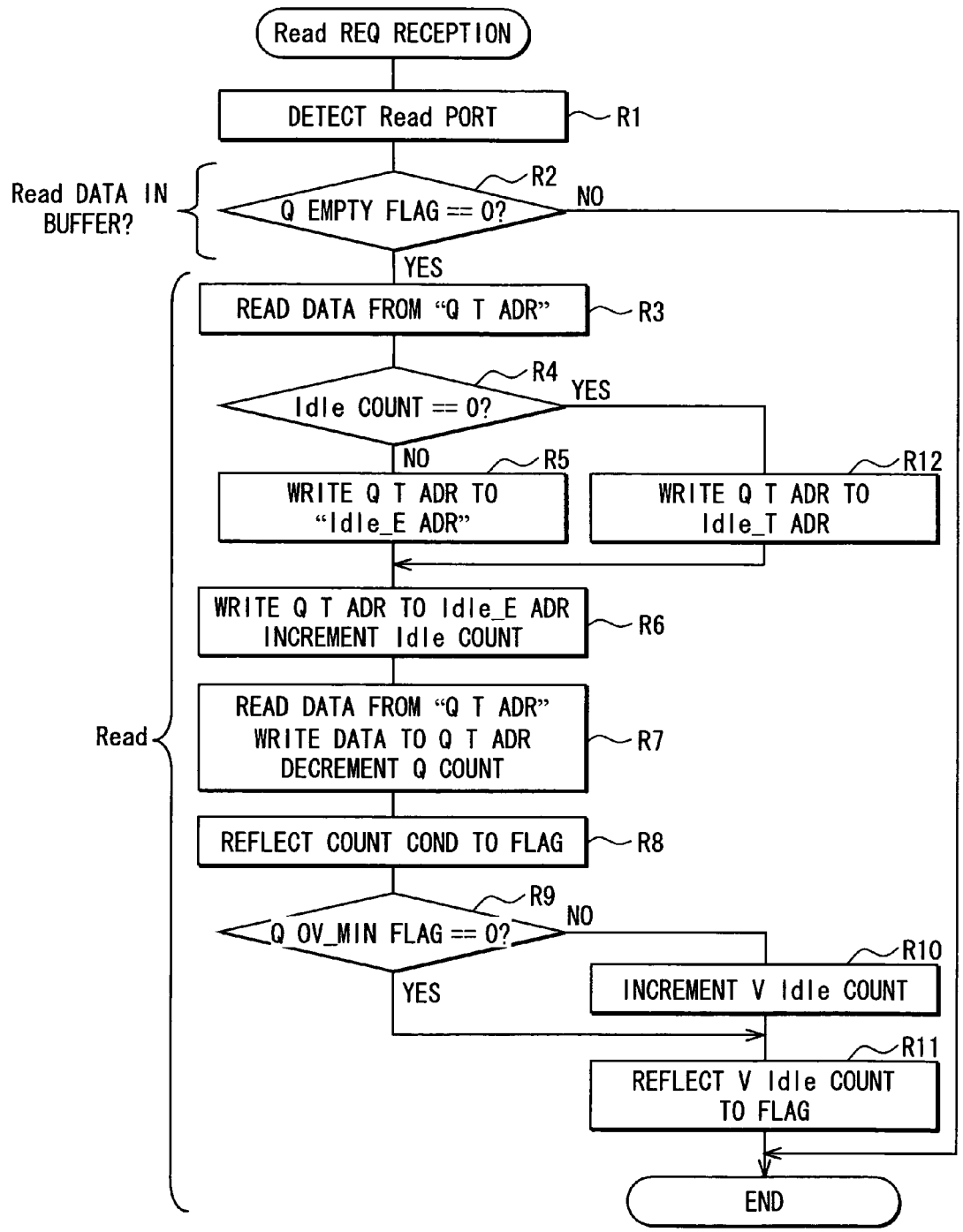
FIG. 6 shows a flowchart of details of a Read control in the first embodiment.
Figure 8:
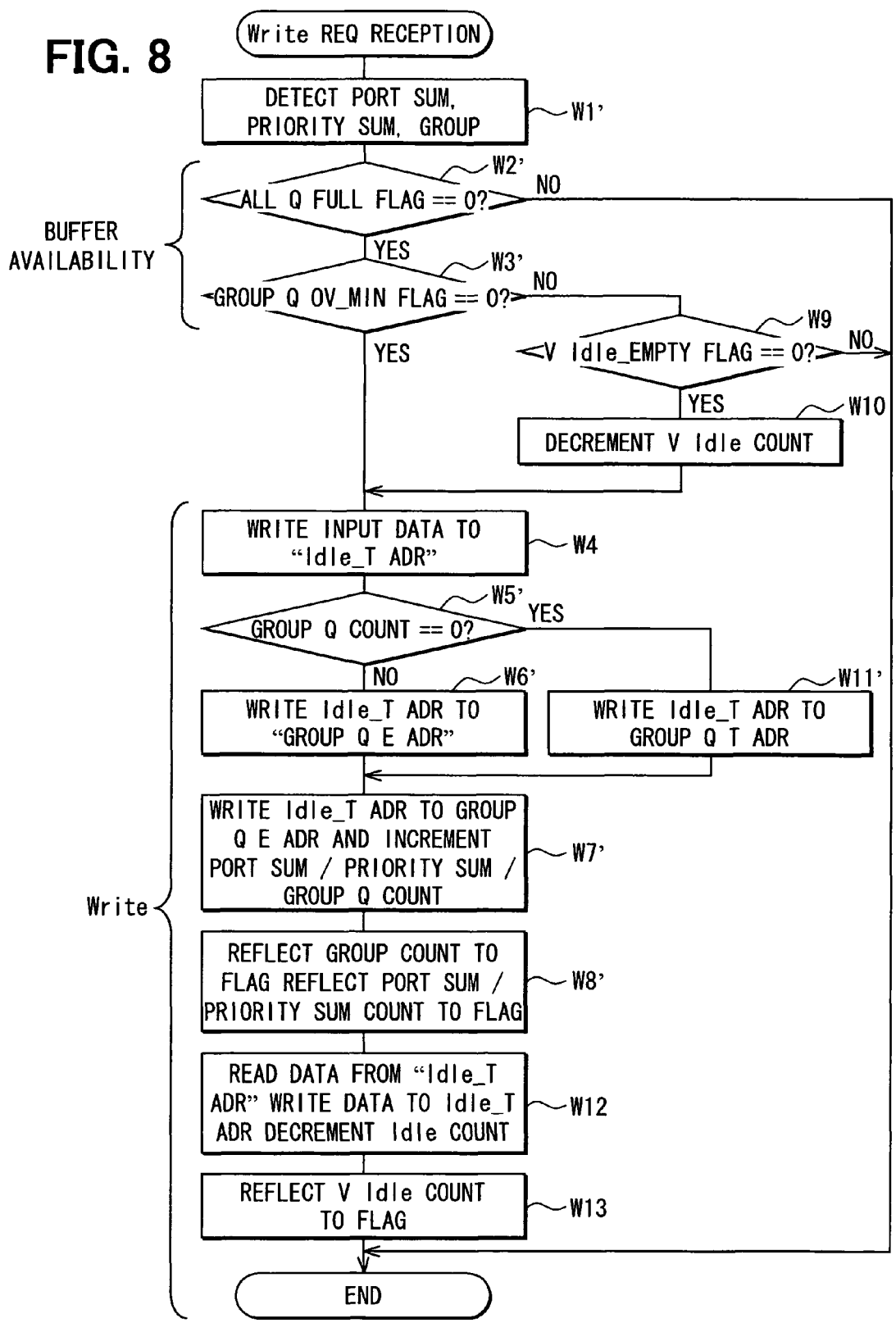
FIG. 8 shows a flowchart of details of a Write control in the second embodiment.
Figure 9:
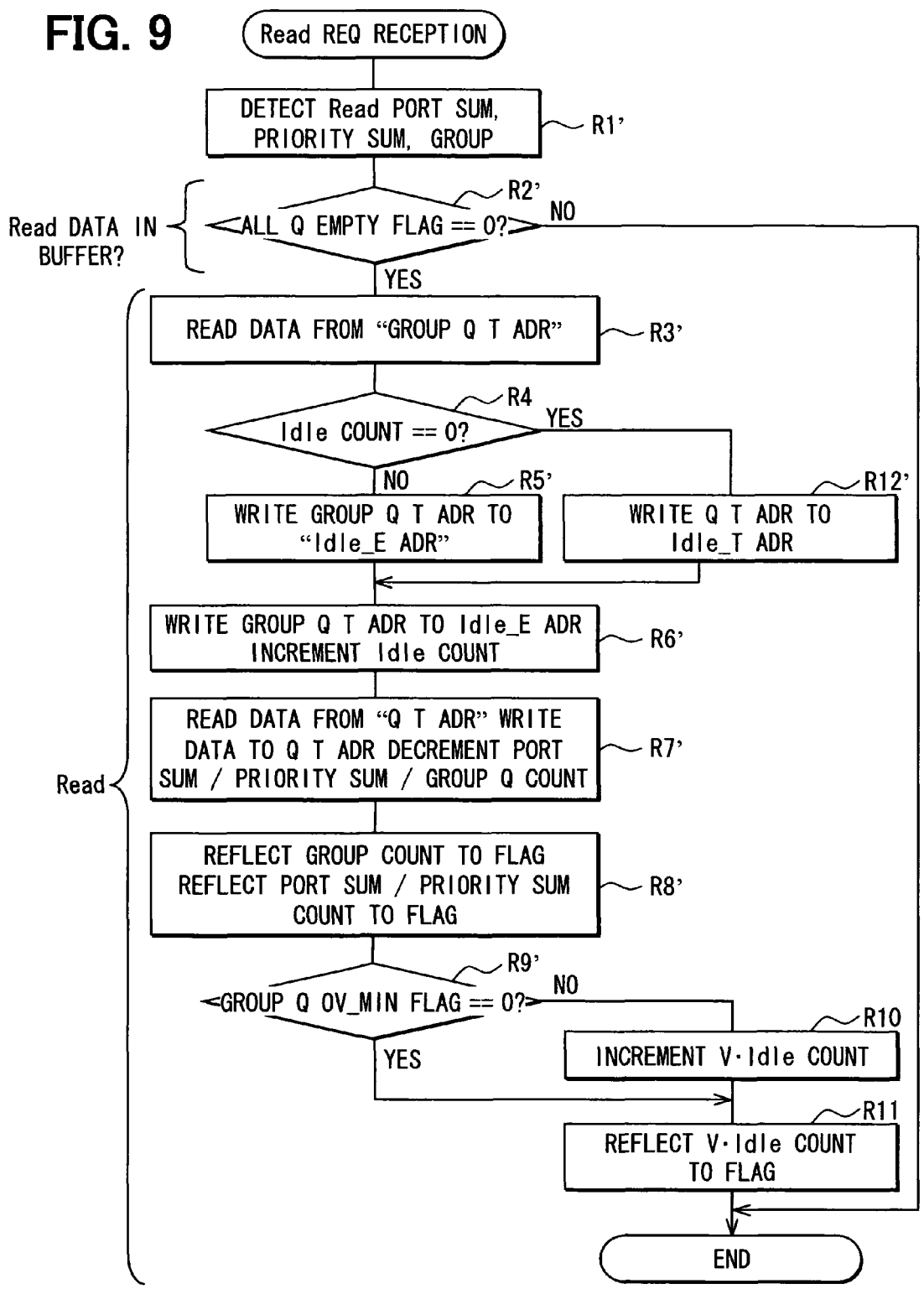
FIG. 9 shows a flowchart of details of a Read control in the second embodiment.

In addition, FIGS. 8 and 9 correspond to FIGS. 5 and 6 of the first embodiment. The basic processing of the second embodiment is similar to the first embodiment. The processing to identify an accessing unit together with the group of the accessing unit is added to the processing that is referred to with a step number having an apostrophe "'." For example, in step W1' of FIG. 8, the process distinguishes which one of the groups of P0-P7 the unit that requested writing belongs to (which port total administration unit the unit belongs to), and which of the High, Mid, and Low priority total administration unit the unit belongs to. In step W2', the process determines whether all queue FULL flags of the group, the priority administration unit, and the port total administration unit belong to are "zero." In addition, in step W8', each queue flag reflects the counter state of the object group, and the queue FULL flag also reflects the counter state of the port total administration unit and the priority total administration unit. Also, in the Read control as shown in FIG. 9, a similar change is added.

FIGS. 10 and 11A to 11D conceptually illustrate an example of divisional use of the data memory 2 by each of the access units based on the above description. In addition, a case that there are, in total, 12 units for four ports of P0-P3 is shown for the simplicity of explanation. Further, it is assumed that the size of the data memory 2 is 512 frames.

Figure 11A:
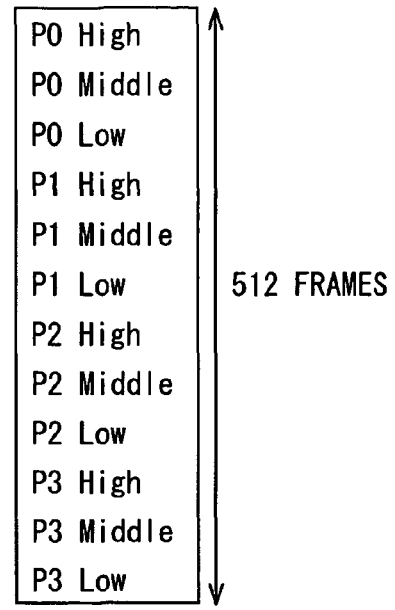

When the number of the upper limit is set to the upper limit of "512" in FIG. 11A about a queue unit, an output port unit, and a class unit of each group, the settings of the number of the upper limit are considered as loosest. That is, one of the other units can use the vacant area up to the maximum (<512) shown in the virtual idle counter except that the number of the lower limit of the queue is secured for each unit. In addition, about each of the ports P0-P3, and each of the class High, Mid, and Low, similar settings are used When, in FIG. 11B, in comparison to FIG. 11A, the upper limit of the queue unit of each group is set to 42 frames for class High, and 43 frames for class Mid and Low for equally dividing 512 frames to each port. In addition, though the upper limit of the port unit and the class unit are set to 512 frames, 128 frames (=42+43+43) are the substantial upper limit.

The numbers of the upper limit are inclined in the illustration in FIG. 11C. That is, for port P0, the upper limit of each class is 64 frames, and, for ports P1, P2, the upper limits of each class are respectively set to 48 and 32 frames. Further, for port P3, the upper limit is only set to 80 frames for the port itself without having the upper limit of the class unit.

Figure 11B:
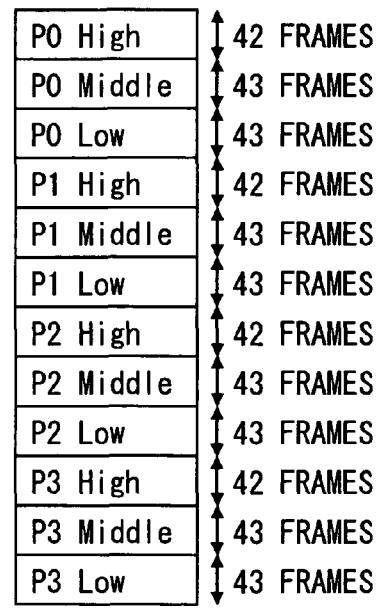

In FIG. 11B, the upper limit is set to 128 frames for each of the ports P0-P3 for equally dividing. Further, the upper limit setting for the queue unit is set to 50 frames, and the total of 128 frames is set for the control range.

Figure 7:
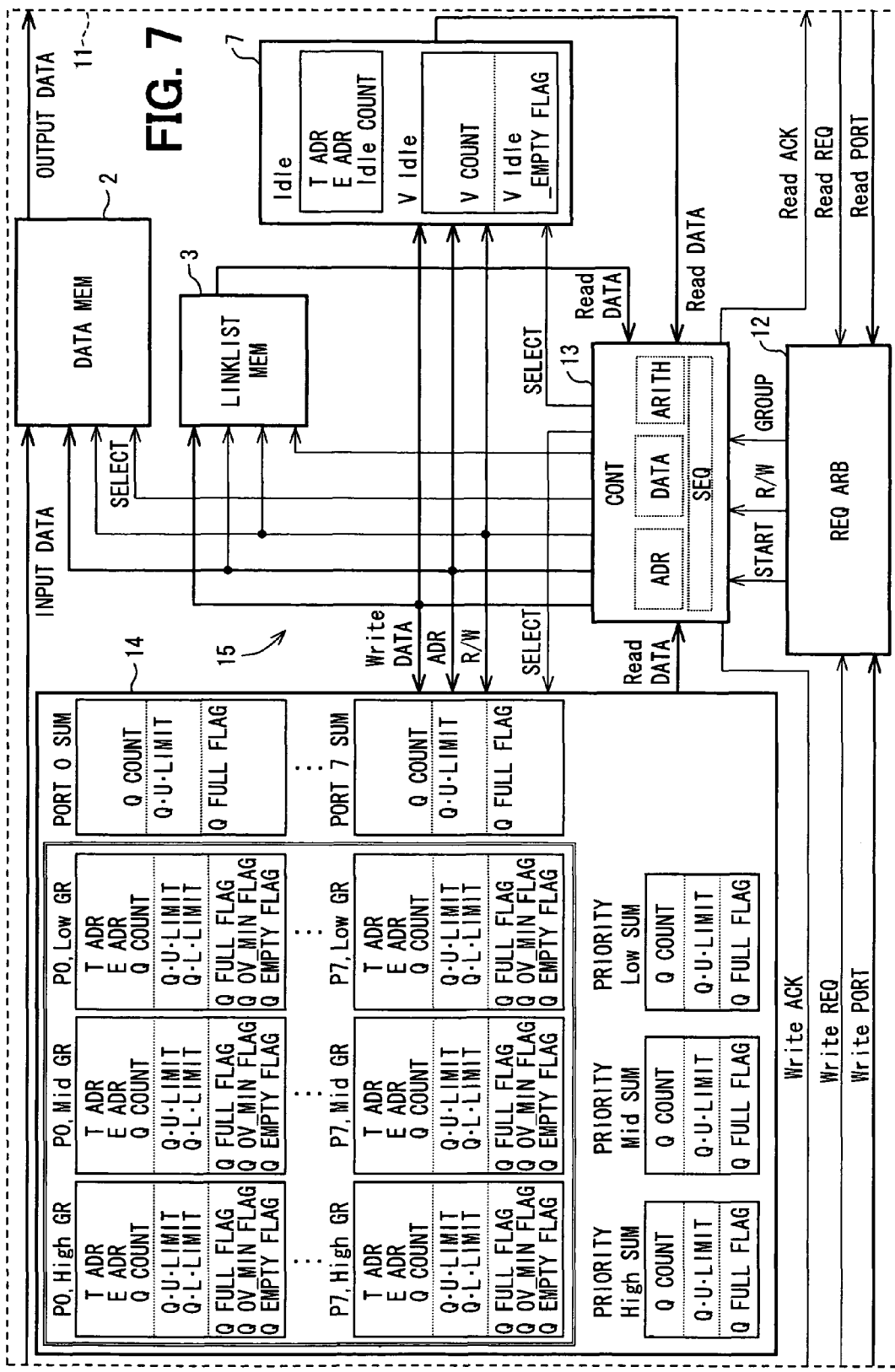
FIG. 7 shows a block diagram of the memory management apparatus in a second embodiment of the present invention.
Figure 12:
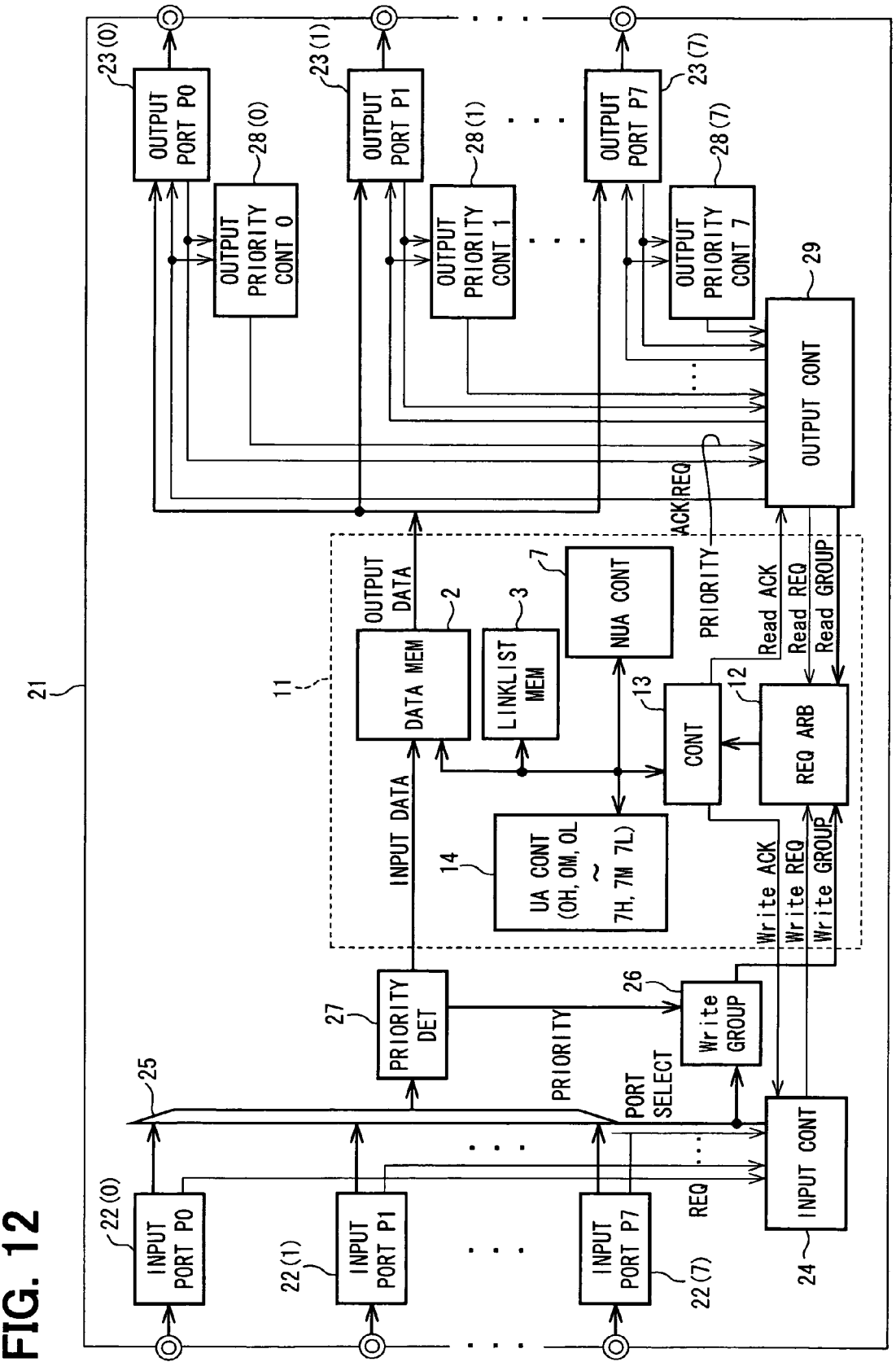
FIG. 12 shows a block diagram of a data input and output apparatus equipped with a data input and output system.

In addition, the illustration in FIG. 12 shows a structure of, for example, an IC chip of a communication data input and output device that includes the data input and output system 11 as shown in FIG. 7 with an addition of components performing input/output control of the ports P0-P7 at the outskirts of the system 11. In a communication data input-output device 21, an input port 22 and an output port 23 for each of the eight ports of P0-P7 are separately provided. That is, the data is read through the output port 23 (0) to be output to an outside when the data is input through the input port 22 (0) and written in to the data memory 2.

When the input port 22 outputs a request signal to the input control unit 24, the request signal is mediated, and the input control unit 24 outputs a port select signal to a multiplexer 25 and a Write group setting unit 26, and, for request arbitration unit 12 of the data input and output system 11, a Write request signal is output. The data from the input port 22 after a choice by the input control unit 24 is output to a priority determination unit 27 through the multiplexer 25, and is further output to the data memory 2 of the data input and output system 11. For each of the ports, there are priority groups of High, Mid, and Low, and, when more than 2 of those groups output a request in a port, the group of higher priority is selected in the port. Further, a priority determination unit 27 outputs a determination result to the Write group setting unit 26 when priority attached to the data which is output by a selected port.

The Write group setting unit 26 sets, based on a given port and priority, a Write group (one of the access units), and outputs the group to the request arbitration unit 12. In addition, a Write acknowledge signal which the control unit 13 of the data input and output system 11 outputs is provided for the input control unit 24.

On the other hand, an output priority determination unit 28 determines the priority of a port group attached to the above request signal, and outputs the determination result to an output control unit 29 when the output port 23 outputs the request signal to the output priority determination unit 28 and output control unit 29 respectively corresponding to the output port 23 itself. Then, the output control unit 29 sets a Read group (one of the access units) according to an input of the request signal and priority, and outputs the setting for the request arbitration unit 12 together with a Read request signal. Further, the data output from the data memory 2 is configured to be output to each output port 23. In addition, the Read acknowledge signal from the control unit 13 is provided for the output control unit 29, and the output control unit 29 outputs the acknowledge signal to one of the selected output ports.

As described above in the second embodiment, in plural ports of P0-P7, three groups of priority classes are set, and, in each of the classes, the access groups are provided with the queue counter provided to the access groups. Each of the queue counters are provided with the upper limit. The control unit 13 performs the same determination process for the upper limit as the upper limits of the each of the queue counters of the ports P0-P7, and also performs the same count operation for each of the queue counters of the groups as the queue counters of the ports P0-P7. Therefore, a variety of upper limit settings are provided according to an application.

(Third Embodiment)

FIG. 13 shows a flowchart of the operation of the third embodiment of the present invention, and a different part of the third embodiment from the first embodiment is described. FIG. 13 corresponds to FIG. 1 of the first embodiment. As the Write control of the first embodiment, data writing to the data memory 2 is prohibited when it is determined as "NO" in steps W2, W9, in the third embodiment, step W14 is carried out instead for writing an input data at an address of the data memory 2 which is indicated by the queue top address register of the writing port.

Though data writing is prohibited due to no vacancy in the data memory 2 for "NO" case in steps W2, W9 in the first embodiment, the oldest data among the data which are not yet read out at the top address of the use area of the writing port is overwritten by the latest input data. Then, an address value of the queue top register is written in at an address of the link list memory indicated by the queue end register and at the queue end register in steps W15, W16, and data are read from an address of the link list memory indicated by an address value of the queue top register, and the data are written in at the queue top address in step W17, and the data is managed as the latest data. Therefore, data memory can memorize the latest data without losing the latest data.

In the above contents, the control unit 5 may be conceptually claimed as a (read) control unit and a (write) control unit. Further, the use area administration unit 6 may be conceptually claimed as a (read) control unit and a (write) control unit. Further, the vacant area administration unit 7 may be conceptually claimed as a (read) control unit and a (writ) control unit. Further, the control unit 13 may be conceptually claimed as a (read) control unit and a (write) control unit. Further, the use area administration unit 14 may be conceptually claimed as a (read) control unit and a (write) control unit.

The present invention is not limited to the description and the drawing of the above embodiments, but various modifications or applications are possible. That is, for example, the number of access units may be changed according to an individual design requirement.

Such changes and modifications are to be understood as being within the scope of the present invention as defined by the appended claims.

What is claimed is:

1. A memory management apparatus comprising:
a data memory;
a link list memory;
a plurality of access units that write and read data from the data memory, the plurality of the access units are divided into plural access groups, each of the plurality of the access units belonging to at least one of the plural access groups,
a control unit configured to manage a use area of the data memory and a vacant area of the data memory by using the link list memory when a data-writing operation to the data memory or a data-reading operation from the data memory is requested by one of the plurality of access units;
a queue top register in each of the plurality of the access units capable of storing a top address of the use area of the data memory that is used by respective access units;
a queue end register in each of the plurality of the access units capable of storing an end address of the use area of the data memory that is used by respective access units;
a queue counter in each of the plurality of the access units capable of counting an area size used by respective access units, and each of the plural access groups has a queue counter;
an idle top register capable of storing a top idle address of the vacant area;
an idle end register capable of storing an end idle address of the vacant area of the data memory;
an idle counter capable of counting a vacant area size; and
a virtual idle counter capable of storing a difference value between an idle counter value and a total of differences between counter values and minimum queue counter values of respective queue counters if a counter value is smaller than a minimum queue counter value in respective queue counters, wherein the respective queue counters have a maximum counter value and a minimum counter value that corresponds to a minimum queue reservation number,
wherein
the control unit sets only a maximum value for the queue counter of each of the plural access groups,
the control unit performs a same determination process for the maximum value of the queue counter as the maximum value of the queue counter of each of the plurality of the access units,
the control unit uses the queue counter of each of the access groups in a queue count operation in a same manner as the queue counter of each of the plurality of the access units,
the control unit performs as a write control unit,
when a write request from one of the plurality of the access units exits, the write control unit performs following processes, the following processes include:
the write control unit prohibits data writing to the data memory, if a queue counter value of a requesting access unit exceeds the maximum counter value, or if the queue counter value is smaller than the maximum counter value and is one of equal to and greater than the minimum counter value with the idle counter value being equal to zero,
the write control unit writes data to an address indicated by the idle top register after decrementing the queue counter, if the queue counter value of the requesting access unit is smaller than the minimum counter value, or if the queue counter value is smaller than the maximum counter value and is one of equal to and greater than the minimum counter value with the virtual idle counter value not being equal to zero,
the write control unit writes an address value in the idle top register to the link list memory address that is indicated by the queue end register of the requesting access unit if the queue counter value of the requesting access unit is not equal to zero,
the write control unit writes the address value to the queue top register of the requesting access unit if the queue counter value of the requesting access unit is equal to zero,
the write control unit increments the queue counter of the requesting access unit after writing a content of the idle top register to the queue end register of the requesting access unit, and
the write control unit decrements the idle counter after reading data from the link list memory address that is shown by the idle top register and writing the data to the idle top register.

2. The memory management apparatus of claim 1, wherein
the control unit perform as a read control unit,
when a read request from one of the plurality of the access units exits, the read control unit performs following processes, the following processes include:
if the queue counter of the requesting access unit is equal to zero, the read control unit prohibits data reading from the data memory,
if the queue counter of the requesting access unit is not equal to zero, the read control unit reads data from an address of the data memory that is indicated by the queue top register of the requesting access unit,
if the idle counter value is not equal to zero, the read control unit increments the idle counter after writing a content of the queue top register of the requesting access unit to both of an address of the link list memory indicated by the idle end register and the idle end register,
if the idle counter value is equal to zero, the read control unit increments the idle counter after writing the content of the queue top register of the requesting access unit to both of the idle top register and the idle end register,
the read control unit decrements the queue counter of the requesting access unit after reading data from an address of the link list memory indicated by the queue top register of the requesting access unit and writing the data to the queue top register, and
if the queue counter value of the requesting access unit is greater than the minimum value, the read control unit increments the virtual idle counter.

3. The memory management apparatus of claim 1, wherein the plurality of access units is made to belong to both a first access group that is made of plural output ports set in the data memory and a second access group that is made of plural priority steps set in each of the plural output ports.

4. The A memory management apparatus, comprising:
a data memory;
a link list memory;
a plurality of access units that write and read data from the data memory, the plurality of the access units are divided into plural access groups, each of the plurality of the access units belonging to at least one of the plural access groups;

a control unit configured to manage a use area of the data memory and a vacant area of the data memory by using the link list memory when a data-writing operation to the data memory or a data-reading operation from the data memory is requested by one of the plurality of access units;

a queue top register in each of the plurality of the access units capable of storing a top address of a data memory use area that is used by respective access units;

a queue end register in each of the plurality of the access units capable of storing an end address of the data memory use area that is used by respective access units;

a queue counter in each of the plurality of the access units capable of counting an area size used by respective access units, and each of the plural access groups has a queue counter;

an idle top register capable of storing a top idle address of the vacant area;

an idle end register capable of storing an end idle address of the vacant area;

an idle counter capable of counting a vacant area size;

a virtual idle counter capable of storing a difference value between an idle counter value and a total of differences between queue counter values and minimum queue counter values of respective queue counters if a counter value is smaller than a minimum queue counter value in respective queue counters, wherein the respective queue counters have a maximum counter value and a minimum counter value that corresponds to a minimum queue reservation number, wherein the control unit sets only a maximum value for the queue counter of each of the plural access groups, the control unit performs a same determination process for the maximum value of the queue counter as the maximum value of the queue counter of each of the plurality of the access units, and the control unit uses the queue counter of each of the access groups in a queue count operation in a same manner as the queue counter of each of the plurality of the access units the control unit performs as a write control unit, when a write request from one of the plurality of the access units exits, the write control unit performs following processes, the following processes include:

the write control unit writes data to an address that is indicated by the queue top register of a use area of the requesting access unit, and writes an address value of the queue top register to both of an address of the link list memory indicated by the queue end register and the queue end register, and reads data from an address of the link list memory indicated by the address value of the queue top register, and writes the data to the queue top address, if a queue counter value of a requesting access unit exceeds the maximum value, or if the queue counter value is smaller than the maximum value and is one of equal to and greater than the minimum value with the virtual idle counter value being equal to zero, the write control unit writes data to an address indicated by the idle top register after decrementing the queue counter, if the queue counter value of the requesting access unit is smaller than the minimum counter value, or if the queue counter value is smaller than the maximum counter value and is one of equal to and greater than the minimum counter value with the virtual idle counter value not being equal to zero, the write control unit writes an address value in the idle top register to the link list memory address that is indicated by the queue end register of the requesting access unit if the queue counter value of the requesting access unit is not equal to zero, the write control unit writes the address value to the queue top register of the requesting access unit if the queue counter value of the requesting access unit is equal to zero, the write control unit increments the queue counter of the requesting access unit after writing a content of the idle top register to the queue end register of the requesting access unit, and the write control unit decrements the idle counter after reading data from the link list memory address that is indicated by the idle top register and writing the data to the idle top register.

5. The memory management apparatus of claim 4, wherein the plurality of access units is made to belong to both a first access group that is made of plural output ports set in the data memory and a second access group that is made of plural priority steps set in each of the plural output ports.

6. The memory management apparatus of claim 4, wherein the control unit perform as a read control unit, when a read request from one of the plurality of the access units exits, the read control unit performs following processes, the following processes include:

if the queue counter of the requesting access unit is equal to zero, the read control unit prohibits data reading from the data memory, if the queue counter of the requesting access unit is not equal to zero, the read control unit reads data from an address of the data memory that is indicated by the queue top register of the requesting access unit, if the idle counter value is not equal to zero, the read control unit increments the idle counter after writing a content of the queue top register of the requesting access unit to both of an address of the link list memory indicated by the idle end register and the idle end register, if the idle counter value is equal to zero, the read control unit increments the idle counter after writing the content of the queue top register of the requesting access unit to both of the idle top register and the idle end register, the read control unit decrements the queue counter of the requesting access unit after reading data from an address of the link list memory indicated by the queue top register of the requesting access unit and writing the data to the queue top register, and if the queue counter value of the requesting access unit is greater than the minimum value, the read control unit increments the virtual idle counter.

7. A method for memory management that writes data under a write request to a data memory and outputs data under a read request by reading the data from the data memory by managing a use area and a vacant area of the data memory based on utilization of a link list memory, the method comprising:

limiting the use area in the data memory by each of a plurality of access units that reads the data from the data memory and writes the data to the data memory, the plurality of the access units being divided into plural access groups, each of the plurality of the access unit belonging to at least one of the plural access groups;

allocating the use area for each of the plurality of access units without exception;

providing a queue top register and a queue end register that respectively store a top address and an end address of the use area in the data memory for use of each of the plurality of the access units;
providing a queue counter that counts a use area size in the data memory for use of each of the plurality of the access units, each of the plural access groups has a queue counter;
providing an idle top register and an idle end register that respectively store a top address and an end address of the vacant area;
providing an idle counter that counts a vacant area size; and
providing a virtual idle counter that stores a difference value between an idle counter value and a total of differences between counter values and minimum queue counter values of respective queue counters if a counter value is smaller than a minimum queue counter value in respective queue counters, wherein the respective queue counters have a maximum counter value and a minimum counter value that corresponds to a minimum queue reservation number,
wherein,
when a write request from one of the plurality of the access units exits, following processes are performed, the following processes include:
prohibiting data writing to the data memory, if a queue counter value of a requesting access unit exceeds the maximum counter value, or if the queue counter value is smaller than the maximum counter value and is one of equal to and greater than the minimum counter value with the idle counter value being equal to zero,
writing data to an address indicated by the idle top register after decrementing the queue counter, if the queue counter value of the requesting access unit is smaller than the minimum counter value, or if the queue counter value is smaller than the maximum counter value and is one of equal to and greater than the minimum counter value with the virtual idle counter value not being equal to zero,
writing an address value in the idle top register to the link list memory address that is indicated by the queue end register of the requesting access unit if the queue counter value of the requesting access unit is not equal to zero,
writing the address value to the queue top register of the requesting access unit if the queue counter value of the requesting access unit is equal to zero,
incrementing the queue counter of the requesting access unit after writing a content of the idle top register to the queue end register of the requesting access unit, and
decrementing the idle counter after reading data from the link list memory address that is shown by the idle top register and writing the data to the idle top register,
setting only a maximum value for the queue counter of each of the plural access groups
performing a same determination process for the maximum value of the queue counter as the maximum value of the queue counter of each of the plurality of the access units, and
using the queue counter of each of the access groups in a queue count operation in a same manner as the queue counter of each of the plurality of the access units.

8. The method of claim 7, wherein,
when a read request from one of the plurality of the access units exits, the following processes are performed, the following processes include:
if the queue counter of the requesting access unit is equal to zero, prohibiting data reading from the data memory,
if the queue counter of the requesting access unit is not equal to zero, reading data from an address of the data memory that is indicated by the queue top register of the requesting access unit,
if the idle counter value is not equal to zero, incrementing the idle counter after writing a content of the queue top register of the requesting access unit to both of an address of the link list memory indicated by the idle end register and the idle end register,
if the idle counter value is equal to zero, incrementing the idle counter after writing the content of the queue top register of the requesting access unit to both of the idle top register and the idle end register,
decrementing the queue counter of the requesting access unit after reading data from an address of the link list memory indicated by the queue top register of the requesting access unit and writing the data to the queue top register, and
if the queue counter value of the requesting access unit is greater than the minimum value, incrementing the virtual idle counter.

9. The memory management apparatus of claim 7, wherein the plurality of access units is made to belong to both a first access group that is made of plural output ports set in the data memory and a second access group that is made of plural priority steps set in each of the plural output ports.

10. A method for memory management that writes data under a write request to a data memory and outputs data under a read request by reading the data from the data memory by managing a use area and a vacant area of the data memory based on utilization of a link list memory, the method comprising:
limiting the use area in the data memory by each of a plurality of access units that reads the data from the data memory and writes the data to the data memory, the plurality of the access units being divided into plural access groups, each of the plurality of the access unit belonging to at least one of the plural access groups;
allocating the use area for each of the plurality of access units without exception;
providing a queue top register and a queue end register that respectively store a top address and an end address of the use area in the data memory for use of each of the plurality of the access units;
providing a queue counter that counts a use area size in the data memory for use of each of the plurality of the access units, each of the plural access groups having a queue counter;
providing an idle top register and an idle end register that respectively store a top address and an end address of the vacant area;
providing an idle counter that counts a vacant area size; and
providing a virtual idle counter that stores a difference value between an idle counter value and a total of differences between counter values and minimum queue counter values of respective queue counters if a counter value is smaller than a minimum queue counter value in respective queue counters, wherein the respective queue counters have a maximum counter value and a minimum counter value that corresponds to a minimum queue reservation number, wherein,
when a write request from one of the plurality of the access units exits, following processes are performed, the following processes include:
writing data to an address that is indicated by the queue top register of a use area of one of the plurality of the access units, and writing an address value of the queue top register to both of an address of the link list memory indicated by the queue end register and the queue end register, and reading data from an address of the link list memory indicated by an address value of the queue top register, and writing to the queue top address, if a queue counter value of a requesting access unit exceeds the maximum value, or if the queue counter value is smaller than the maximum value and is one of equal to and greater than the minimum value with the virtual idle counter value being equal to zero, writing data to an address indicated by the idle top register after decrementing the queue counter, if the queue counter value of the requesting access unit is smaller than the minimum counter value with the virtual idle counter value not being equal to zero, or if the queue counter value is smaller than the maximum counter value and is one of equal to and greater than the minimum counter value with the virtual idle counter value not being equal to zero, writing an address value in the idle top register to a link list memory address that is indicated by the queue end register of the requesting access unit if the queue counter value of the requesting access unit is not equal to zero, writing the address value to the queue top register of the requesting access unit if the queue counter value of the requesting access unit is equal to zero, incrementing the queue counter of the requesting access unit after writing a content of the idle top register to the queue end register of the requesting access unit, decrementing the idle counter after reading data from the link list memory address that is shown by the idle top register and writing the data to the idle top register;

setting only a maximum value for the queue counter of each of the plural access groups performing a same determination process for the maximum value of the queue counter as the maximum value of the queue counter of each of the plurality of the access units, and using the queue counter of each of the access groups in a queue count operation in a same manner as the queue counter of each of the plurality of the access units.

11. The memory management apparatus of claim 10, wherein the plurality of access units is made to belong to both a first access group that is made of plural output ports set in the data memory and a second access group that is made of plural priority steps set in each of the plural output ports.

12. The method of claim 10, wherein, when a read request from one of the plurality of the access units exits, the following processes are performed, the following processes include:

if the queue counter of the requesting access unit is equal to zero, prohibiting data reading from the data memory, if the queue counter of the requesting access unit is not equal to zero, reading data from an address of the data memory that is indicated by the queue top register of the requesting access unit, if the idle counter value is not equal to zero, incrementing the idle counter after writing a content of the queue top register of the requesting access unit to both of an address of the link list memory indicated by the idle end register and the idle end register, if the idle counter value is equal to zero, incrementing the idle counter after writing the content of the queue top register of the requesting access unit to both of the idle top register and the idle end register, decrementing the queue counter of the requesting access unit after reading data from an address of the link list memory indicated by the queue top register of the requesting access unit and writing the data to the queue top register, and if the queue counter value of the requesting access unit is greater than the minimum value, incrementing the virtual idle counter.

\* \* \* \* \*